United States Patent
Sünger et al.

(10) Patent No.: US 9,132,505 B2
(45) Date of Patent: Sep. 15, 2015

(54) FRICTION STIR WELDING APPARATUS AND METHOD FOR JOINING WORKPIECES BY MEANS OF A SLIDING ELEMENT

(75) Inventors: Sahin Sünger, Bergkirchen (DE); Franz Xaver Wirth, Bissingen (DE)

(73) Assignee: TECHNISCHE UNIVERSITÄT MÜNCHEN, München (DE)

( * ) Notice: Subject to any disclaimer, the term of this patent is extended or adjusted under 35 U.S.C. 154(b) by 0 days.

(21) Appl. No.: 14/240,678

(22) PCT Filed: Jul. 17, 2012

(86) PCT No.: PCT/EP2012/003011
§ 371 (c)(1),
(2), (4) Date: Jun. 10, 2014

(87) PCT Pub. No.: WO2013/026513
PCT Pub. Date: Feb. 28, 2013

(65) Prior Publication Data
US 2015/0069114 A1    Mar. 12, 2015

(30) Foreign Application Priority Data
Aug. 24, 2011    (DE) .......................... 10 2011 011 758

(51) Int. Cl.
*B23K 20/12*    (2006.01)

(52) U.S. Cl.
CPC ........... *B23K 20/1245* (2013.01); *B23K 20/126* (2013.01); *B23K 20/1255* (2013.01)

(58) Field of Classification Search
CPC . B23K 20/122; B23K 20/1245; B23K 20/126
See application file for complete search history.

(56) References Cited

U.S. PATENT DOCUMENTS 6,264,088 B1    7/2001    Larsson
7,404,512 B2 *  7/2008    Baumann et al. ............ 228/44.3
(Continued)

FOREIGN PATENT DOCUMENTS

DE    19955737 A1    6/2001
DE    102005030800 A1    1/2007
(Continued)

OTHER PUBLICATIONS

Mishra & Mahoney 2007, "Friction Stir Welding and Processing"- 1st. Edition; ASM International 2007; ISBN 087170840X, p. 1.
(Continued)

*Primary Examiner* — Devang R Patel
*Assistant Examiner* — Carlos Gamino
(74) *Attorney, Agent, or Firm* — Michael Best & Friedrich LLP

(57) ABSTRACT

The invention relates to a friction stir welding apparatus for joining workpieces 1, 2, having a welding pin 3, which is rotatable about its center axis 9 by means of a drive, and having at least one clamping apparatus for clamping the workpieces 1, 2 to be joined, characterized in that the clamping apparatus comprises at least two clamping elements 10, 11, which respectively have an undercut guideway 12, the guideways 12 being arranged parallel to one another and parallel to a joining region 8, in that between the clamping elements 10, 11 is arranged a sliding element 13, which is secured by the guideways 12 against the workpieces 1, 2 and is translatorily displaceable along the guideways 12, and in that the sliding element 12 is provided with an opening 14 for the lead-through of the welding pin 3, and further relates to a method for friction stir welding, using the above-stated apparatus.

20 Claims, 3 Drawing Sheets

(56) References Cited

U.S. PATENT DOCUMENTS

| | | | |
|---|---|---|---|
| 7,699,206 B2* | 4/2010 | Matlack et al. | 228/2.1 |
| 7,721,938 B2* | 5/2010 | Nagano | 228/112.1 |
| 2004/0079787 A1* | 4/2004 | Okamoto et al. | 228/112.1 |
| 2005/0045693 A1* | 3/2005 | Buchheit et al. | 228/112.1 |
| 2006/0124691 A1 | 6/2006 | Wood et al. | |
| 2007/0119906 A1* | 5/2007 | Mika | 228/112.1 |
| 2009/0065553 A1* | 3/2009 | Burg et al. | 228/2.1 |
| 2009/0152328 A1* | 6/2009 | Okamoto et al. | 228/112.1 |
| 2010/0006622 A1* | 1/2010 | Smith et al. | 228/2.1 |
| 2012/0193401 A1* | 8/2012 | Hori et al. | 228/112.1 |
| 2013/0037601 A1* | 2/2013 | Eller et al. | 228/112.1 |
| 2013/0206817 A1* | 8/2013 | Tavares et al. | 228/112.1 |
| 2013/0255884 A1* | 10/2013 | Baumann et al. | 156/538 |

FOREIGN PATENT DOCUMENTS

| | | |
|---|---|---|
| EP | 2578348 A2 * | 4/2013 |
| WO | 93/10935 A1 | 6/1993 |
| WO | 00/02704 A1 | 1/2000 |
| WO | 01/28732 A1 | 4/2001 |
| WO | 2012/007573 A1 | 1/2012 |

OTHER PUBLICATIONS

International Search Report and Written Opinion of the International Searching Authority received in International Patent Application No. PCT/EP2012/003011, mailed Oct. 31, 2012.

* cited by examiner

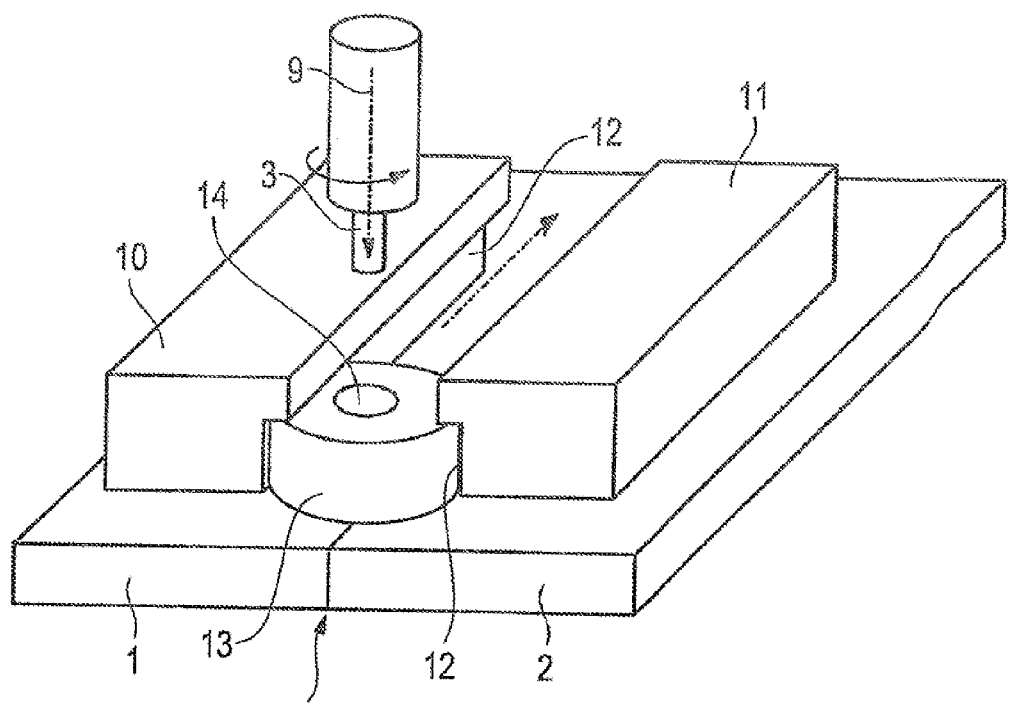
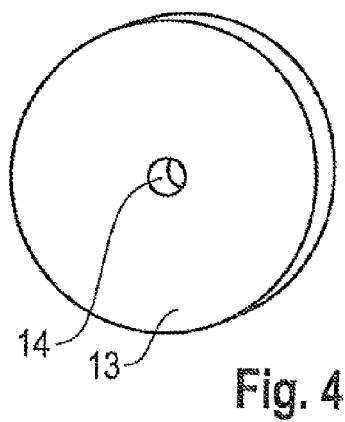
Fig. 4
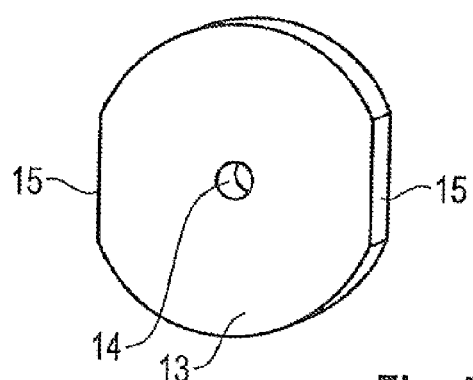
Fig. 5

FRICTION STIR WELDING APPARATUS AND METHOD FOR JOINING WORKPIECES BY MEANS OF A SLIDING ELEMENT

BACKGROUND OF THE INVENTION

The invention relates to a friction stir welding apparatus for joining workpieces and to a method for joining workpieces by means of a friction stir welding process.

The basic principles of friction stir welding processes are previously known, for example, from WO 93/10935 A1.

FIG. 1 shows in schematic representation the flow of a friction stir welding process according to the prior art. Contrary to the conventional friction stir welding processes, the friction stir welding uses a wear-resistant tool, comprising a welding pin 3 and a shoulder 4, to produce an integrally bonded connection. The tool which is used is here contoured such that solid material can be sheared in the contact region and stirred together. The plasticization process is aided by the influence of the generated frictional heat. The process temperatures are typically in the realm of the recrystallization temperature of the base material, so that the parts to be joined are not fused.

The friction stir welding tool has three primary tasks to fulfill (Mishra & Mahoney 2007, "Friction Stir Welding and Processing"-1st. Edition; ASM International 2007; ISBN 087170840X), these are: (1) heat regeneration by friction and shearing; (2) integrally bonded connection of the workpieces (parts to be joined) by stirring of the plasticized material; and (3) sealing of the top side of the seam by the shoulder.

During the joining process, the welding pin plunges fully into the joining region and is responsible for the process flow along the joining surface (butt surface, connecting surface) and for the generation of the material bond.

The task of the shoulder 4 primarily consists in, from the top side of the seam, closing off the joining zone 8. To this end, the tool or the shoulder surface is pressed throughout the joining process with a high contact force, generally at a setting angle of 2° to 4°, piercingly onto the surface of the workpieces. As a result of the relatively large bearing surface, the shoulder 4 is capable of, on the one hand, protecting the still warm weld metal from air access and, on the other hand, to prevent excessive escape of the material and thus the compression and consolidation of the sheared material. Furthermore, the shoulder 4, similarly to the welding pin 3, contributes to the heat generation and material shearing at regions close to the surface.

U.S. Pat. No. 6,264,088 B1 discloses a tool concept in which the welding pin can rotate independently of the shoulder.

Through the use of such a tool with stationary shoulder, various advantages are afforded to the user in relation to a conventional tool concept. These can include the following: (1) a clean, scale-free seam surface is formed, which seam surface, in terms of its appearance, resembles the unaffected base material; (2) the thermal and mechanical influence of the base material is almost homogenous in the direction of depth of the seam; and (3) new fields of application are opened up for friction stir welding, in which regard a T-joint weld seam (wedge seam) should be mentioned as an example.

However, the necessary anti-twist protection, in particular, which must be realized by an auxiliary element, often a bracket, has a negative impact. This bracket connects the tool housing to a fixed part of the machine. With this auxiliary device, an automatic tool change, as is customary in modern metal-working machines, carries the risk of a collision. As a rule, a prior removal of the tool attachment is therefore necessary. A further drawback can be seen in the fact that the contact force of the stationary shoulder must be applied via the drives of the machine.

SUMMARY OF THE INVENTION

The present invention provides, in one aspect, a friction stir welding apparatus for joining workpieces comprising a welding pin, which is rotatable about its center axis by a drive, and at least one clamping apparatus for clamping the workpieces to be joined, wherein the clamping apparatus comprises at least two clamping elements, which respectively have an undercut guideway, the guideways being arranged parallel to one another and parallel to a joining region of the workpieces, wherein a sliding element is arranged between the clamping elements, the sliding element being secured by the guideways against the workpieces and is translatable along the guideways, and wherein the sliding element is provided with an opening for the lead-through of the welding pin.

The present invention provides, in another aspect, a method for joining two workpieces using a friction stir welding process. The method includes securing the workpieces with a clamping apparatus, rotating a welding pin by a drive, introducing the welding pin into a joining region between the workpieces, translating the welding pin along the joining region, pretensioning a sliding element in the joining region against the workpieces by the clamping apparatus, and translating the sliding element along the joining region together with the welding pin, which extends through the sliding element.

The object of the invention is to provide a friction stir welding apparatus with a simple structure and simple, cost-effective producibility, which avoids the drawbacks of the prior art and delivers a good work result.

In addition, the object of the invention is to provide a friction stir welding process of the above-stated type, which, while avoiding the drawbacks of the prior art, delivers a high-quality work result.

With respect to the friction stir welding apparatus according to the invention, it is thus provided that the two workpieces are positioned and clamped relative to each other by means of at least one clamping apparatus. The clamping apparatus comprises at least two clamping elements, which can be of bar-like configuration. The two clamping elements are respectively provided with at least one guideway. The two guideways are arranged parallel to each other and have a distance apart in which the joining zone (joining region) is found. Between the two clamping elements, the welding pin can thus be sunk into the marginal regions of the workpieces to be joined in order to weld these together. The apparatus according to the invention further provides a sliding element, which is held and guided by the guideways of the clamping elements. The sliding element is moved according to the invention in a translatory motion along the guide zone, wherein only the translatory motion between the sliding piece and the workpieces takes place. According to the invention, the sliding element is moved non-rotatingly.

In the solution according to the invention, it is thus provided that the sliding element is held and guided by the two clamping elements. The clamping elements are here configured such that they hold or pretension the sliding element against the surface of the two workpieces, so that the welding pin itself does not have to apply any force component for the securement or pressing of the sliding element.

The invention is thus based on the principle of eliminating the spatial dependence of the shoulder and the welding pin on the tool. To this end, the shoulder of the tool is replaced by a sliding element, which is integrated into the technology for clamping of the workpiece or into additional parts, such as, say, bars. To this end, the sliding element and the clamping jaws are produced such that the sliding element can be moved singly along the welding line. Other translatory or rotary degrees of freedom are limited by the form closure between sliding element and clamping jaws.

In the method according to the invention, the welding pin penetrates a through hole or seat, disposed in the center of the sliding element, in the base material. Through the advancement of the welding pin along the welding line (joining zone), the sliding element is permanently carried along. The joining zone is sealed in the upward direction. The sliding element should be produced from a solid material which is as wear-resistant as possible and which is capable of withstanding the tribological loads. These derive from the friction between the rotating welding pin and the cylindrical surface of an opening (bore) of the sliding element, as well as from the advancement-induced friction between the surface of the base material surface or the clamping jaw surfaces and the sliding element.

The substitution of the tool shoulder with the sliding element produces the following advantages over the conventional concept of a stationary shoulder: (1) significantly lower process forces in the axial direction, since the force flow of the shoulder forms a closed loop via the clamping apparatus; (2) lower design and production and assembly complexity of the tools, since these merely consist of the welding pin; and (3) the welding pin can move independently of the sliding element in the axial direction. End-crater-free seams can thereby be realized by the welding pin being withdrawn from the base material even during the advancement motion, and the missing volume being filled by welding filler material.

The invention thus creates the possibility of applying a suitable contact pressure of the sliding element to the joining region in order to recompress the joining region and smooth the joining region. No or only minor finishing works are therefore necessary.

Since, according to the invention, the contact force is applied to the sliding element by the clamping elements, a considerable reduction in the force flow onto a spindle element of a machine tool, which spindle element supports the rotating welding pin, is obtained. Tests have revealed that the clamping apparatus according to the invention, by means of the clamping elements, enables the contact force of the sliding element against the workpieces to be reduced by up to 50%. According to the invention, it is thus possible to produce burrless joining regions which often require no reworking.

BRIEF DESCRIPTION OF THE DRAWINGS

Below, the invention is described with reference to illustrative embodiments in connection with the drawings, wherein:

FIG. 3 shows a simplified, perspective representation of an illustrative embodiment of the apparatus according to the invention, FIG. 4 shows an illustrative embodiment of a sliding element according to the invention in the form of a circular disk, FIG. 5 shows a perspective representation, analogous to FIG. 4, of a modified embodiment of the sliding element, with flattening.

DETAILED DESCRIPTION

Figure 1:
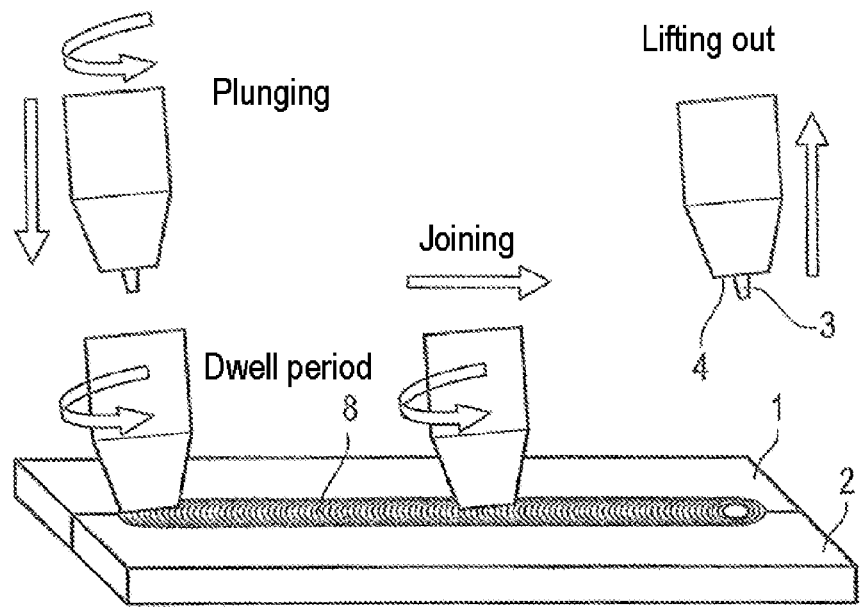
FIG. 1 shows a schematic representation of the friction stir welding process according to the prior art, on which the invention is based.

FIG. 1 shows in schematic representation the individual method steps of the friction stir welding according to the prior art. A friction stir welding tool has a welding pin 3 and is flattened off at its free end, so that an annular shoulder 4 is formed. The tool is firstly plunged into the joining region 8 of the workpieces 1, 2. The entire tool, inclusive of the welding pin 3, rotates hereupon. The tool dwells for a certain period in the joining zone 8 and is subsequently, as represented by the arrow, moved translatorily for the joining, wherein the tool is rotated about its center axis. As a result, both the welding pin 3 and the shoulder 4 enter into engagement with the plasticized material of the workpieces 1, 2.

Figure 2:
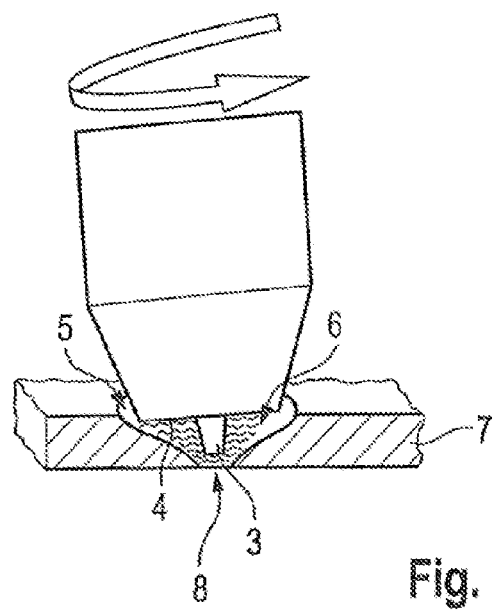
FIG. 2 shows an enlarged representation of the friction stir welding process according to the prior art.

FIG. 2 shows an enlarged detailed view of the joining region 8. A plasticization zone 6, produced by the rotation of the welding pin 3, is here represented. The reference symbol 5 shows the region warmed by the frictional heat, while the reference symbol 7 represents the unaffected base material.

FIG. 3 shows a schematic structure of the apparatus according to the invention. Panel-shaped workpieces 1 and 2 are here represented, which are to be welded together along a joining zone 8 (joining region).

The two workpieces 1 and 2 are secured and positioned by means of bar-like clamping elements 10 and 11. For reasons of simple representation, the detailed design of the clamping elements 10 and 11 and their fixing to the workpieces 1 and 2 have been dispensed with.

The two clamping elements 10 and 11 have on their mutually facing sides in each case an undercut guideway 12, in which a sliding element 13 is displaceable.

The design of the sliding element 13 is explained in detail below with reference to some illustrative embodiments. The sliding element 13 has an opening 14, through which a welding pin 3, which is rotatable about its center axis 9, is inserted and can be sunk into the material of the workpieces 1, 2, as has already been explained in connection with FIGS. 1 and 2.

As a result of a movement of the welding pin 3 along the joining zone 8, the sliding element 13 is moved translatorily along the undercut guideways 12. The sliding element 13 has no further movements relative to the workpieces 1 and 2.

Possible forms and profilings of the sliding element 13 are explained below with reference to schematic representations. Here, various combinations of the individual variants of the sliding elements 13 are possible in order to generate the most suitable solution for the respective welding task.

The basic form of the sliding element is shown in FIG. 4. This variant consists of a circular disk having a centrally made opening 14 (through hole) for the welding pin 3. For the control of the material flow, a specific profiling can also be incorporated into the cylindrical surface of the opening 14. It is thus possible, for example, by a threaded profile, to direct the material flow in the direction of the tool tip and thus improve the sealing effect between welding pin 3 and opening 14. In this basic variant, no anti-twist protection is present. However, the base material displaced by the welding pin 3 brings a high force to bear in the normal direction and thus also a non-positive connection to the sliding element 13, which effectively impairs the rotation. The circular form offers the advantage that, during the advancement, a tilting of the sliding element within the guide (guideways 12) can almost be precluded.

The sliding element 13 shown in FIG. 5 is based on the previously described basic form and is supplemented by two parallel flattenings 15, which serve as sliding surfaces and a positive-locking anti-twist protection in the recesses of the clamping elements 10, 11 (clamping bars).

Figure 6:
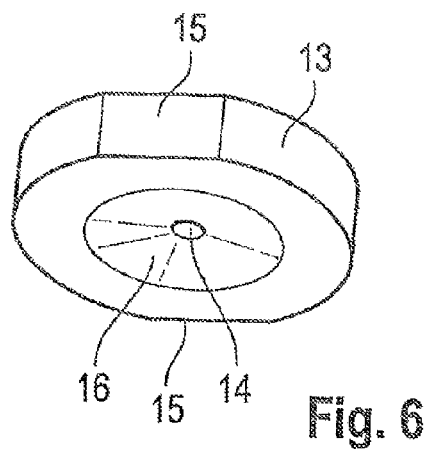
FIG. 6 shows a representation of a further illustrative embodiment of the sliding element according to the invention, with flattening and cavity.

As represented in FIG. 6, the sliding element 13 can, in addition to the two lateral flattenings 15, comprise an additionally incorporated cavity 16. This clearance offers space to the base material displaced by the welding pin 3 and serves as a material reservoir during the welding operation. The cavity 16 can be realized in various forms, such as, for example, a conical or concave opening. However, further geometric variations, in particular as a result of a profiling of the cavity surface, are also possible.

Figure 7:
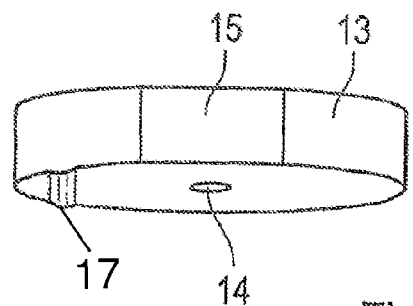
FIG. 7 shows a further illustrative embodiment of a sliding element according to the invention, with flattening and elevation.

In order to aid the compression and consolidation of the sheared material within the joining zone 8, in the sliding element 13 shown in FIG. 7 an additional elevation 17 (compression lip, protruding region) is present, which locally exerts pressure on the base material and can thus promote the consolidation of the sheared material. Through different realizations of the form, position and working length of the compression lip, the effect can be flexibly adapted to the welding operations and the base materials.

Figure 8:
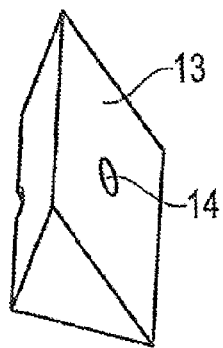
FIG. 8 shows a further illustrative embodiment of a sliding element according to the invention for use with T-joints or angular joints.

In addition to the flat realizations for butt joint or lap joint configurations, according to the invention angled variants of the sliding element 13, for example for welding tasks on T-joints or angular joints having different included angles, are also possible. In this regard, the sliding element 13 shown in FIG. 8, for a weld seam in the T-joint, should be mentioned by way of example. As also already in the case of the flat sliding element variants, in the case of the angled sliding elements the previously described variations, and combinations thereof, are also realizable.

Figure 9:
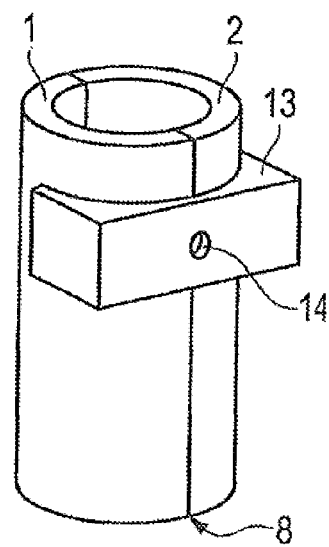
FIG. 9 shows a further illustrative embodiment of a sliding element according to the invention for use with tubular workpieces.

The principle of the spatial separation of shoulder and welding pin 3 on the tool can be implemented, with the aid of a sliding element 13 (FIG. 9), also for friction stir welding on curved components, such as, for example, on pipes and shafts. The main body of the sliding element 13 consists of a shell-shaped component, the recess radius of which corresponds to the outer radius of the workpieces 1, 2 to be welded together. In the center, the sliding element 13 is provided with a suitable opening 14 for the lead-through of the welding pin. Through the use of this element, weld seams can be realized both in the longitudinal and in the peripheral direction. The inner side of the sliding element 13 can be provided with the same modifications for the improvement of the welding result as in the sliding element 13 for flat weld seams. Likewise, similarly to the sliding element, combinations of the various modifications are also here possible.

From the above description of different illustrative embodiments of the invention, it is evident that the sliding element 13 is moved by a translatory motion of the welding pin 3 along the guide zone 8. According to the invention, it is also possible however, alternatively hereto or in support hereof, to provide a separate drive.

Furthermore, it is possible according to the invention to pretension the sliding element 13 with a predefined contact force against the surface of the workpieces 1, 2, for example by an interposed elastic element or by suitable design of the clamping elements 10, 11 for the application of an additional pretensioning force.

Various features of the invention are set forth in the following claims.

The invention claimed is:

1. A friction stir welding apparatus for joining workpieces comprising:
    a welding pin, which is rotatable about a center axis by a drive, and
    at least one clamping apparatus for clamping the workpieces to be joined,
    wherein the clamping apparatus comprises at least two clamping elements, each element having an undercut guideway, the guideways being arranged parallel to one another and parallel to a joining region of the workpieces,
    wherein a sliding element is arranged between the clamping elements, the sliding element being secured by the guideways against the workpieces and is translatable along the guideways,
    wherein the sliding element is provided with an opening for the welding pin, and
    wherein the sliding element is positioned between the workpieces and the welding pin prior to the welding pin entering the opening.

2. The friction stir welding apparatus according to claim 1, wherein the clamping elements are configured to apply a pretensioning force to the sliding element in the direction the welding pin enters the opening.

3. The friction stir welding apparatus according to claim 1, wherein the sliding element is configured as one of a plate and a formed part.

4. The friction stir welding apparatus according to claim 1, wherein the opening of the sliding element is arranged substantially centrically to the sliding element.

5. The friction stir welding apparatus according to claim 1, wherein the sliding element is configured as a circular disk.

6. The friction stir welding apparatus according to claim 1, wherein the sliding element is provided with at least one anti-twist protection.

7. The friction stir welding apparatus according to claim 1, wherein a side of the sliding element facing the workpieces is of at least partially concave configuration.

8. The friction stir welding apparatus according to claim 1, wherein a side of the sliding element facing the workpieces has at least one protruding region.

9. The friction stir welding apparatus of claim 2, wherein the sliding element is configured as one of a plate and a formed part.

10. The friction stir welding apparatus according to claim 9, wherein the opening of the sliding element is arranged substantially centrically to the sliding element.

11. The friction stir welding apparatus according to claim 10, wherein the sliding element is configured as a circular disk.

12. The friction stir welding apparatus according to claim 11, wherein the sliding element is provided with at least one anti-twist protection.

13. The friction stir welding apparatus according to claim 12, wherein a side of the sliding element facing the workpieces is of at least partially concave configuration.

14. The friction stir welding apparatus according to claim 13, wherein a side of the sliding element facing the workpieces has at least one protruding region.

15. The friction stir welding apparatus according to claim 2, wherein the sliding element is configured as a circular disk.

16. The friction stir welding apparatus according to claim 2, wherein the sliding element is provided with at least one anti-twist protection.

17. The friction stir welding apparatus according to claim 2, wherein a side of the sliding element facing the workpieces is of at least partially concave configuration.

18. The friction stir welding apparatus according to claim 2, wherein a side of the sliding element facing the workpieces has at least one protruding region.

19. A method for joining two workpieces using a friction stir welding process, the method comprising:
   providing a friction stir welding apparatus including
   a welding pin, which is rotatable about a center axis by a drive, and
   at least one clamping apparatus for clamping the workpieces to be joined,
   wherein the clamping apparatus comprises at least two clamping elements, each element having an undercut guideway, the guideways being arranged parallel to one another and parallel to a joining region of the workpieces,
   wherein a sliding element is arranged between the clamping elements, the sliding element being secured by the guideways against the workpieces and is translatable along the guideways,
   wherein the sliding element is provided with an opening for the welding pin, and
   wherein the sliding element is positioned between the workpieces and the welding pin prior to the welding pin entering the opening;
   securing the workpieces with the clamping apparatus;
   rotating the welding pin by the drive;
   introducing the welding pin into the joining region between the workpieces;
   pretensioning the sliding element in the joining region against the workpieces by the clamping apparatus;
   translating the sliding element along the joining region together with the welding pin; and
   joining the workpieces along the joining region with the welding pin.

20. The method according to claim 19, wherein the translating the sliding element is applied by one of the welding pin and a separate drive.

* * * * *